United States Patent
Frampton et al.

(10) Patent No.: US 9,431,942 B2
(45) Date of Patent: Aug. 30, 2016

(54) GENERATOR MANAGEMENT SYSTEM THAT SELECTIVELY ACTIVATES GENERATORS BASED ON AN OPERATING PARAMETER

(75) Inventors: Isaac S. Frampton, Strattanville, PA (US); Richard A. Mauk, Sheboygan, WI (US); Douglas W. Dorn, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 979 days.

(21) Appl. No.: 13/540,133

(22) Filed: Jul. 2, 2012

(65) Prior Publication Data

US 2014/0001868 A1    Jan. 2, 2014

(51) Int. Cl.
*H02J 3/00*    (2006.01)
*H02P 9/02*    (2006.01)

(52) U.S. Cl.
CPC ............. *H02P 9/02* (2013.01); *Y10T 307/696* (2015.04)

(58) Field of Classification Search
CPC ........................................................ H02P 9/02
See application file for complete search history.

(56) References Cited

U.S. PATENT DOCUMENTS

| | | |
|---|---|---|
| 2,546,410 A | 3/1951 | Schwendner et al. |
| 2,832,896 A | 4/1958 | Stineman et al. |
| 3,300,647 A | 1/1967 | Gogia et al. |
| 3,489,914 A | 1/1970 | Taylor |
| 4,233,555 A | 11/1980 | Roche |
| 4,302,683 A | 11/1981 | Burton |
| 4,405,892 A | 9/1983 | Staerzl |
| 4,469,071 A | 9/1984 | Bassi et al. |
| 4,625,123 A | 11/1986 | Gillett et al. |
| 4,899,706 A | 2/1990 | Sasaki |
| 5,252,905 A | 10/1993 | Wills et al. |

(Continued)

FOREIGN PATENT DOCUMENTS

| | | |
|---|---|---|
| CN | 201378280 | 1/2010 |
| CN | 201378821 | 1/2010 |

(Continued)

OTHER PUBLICATIONS

"U.S. Appl. No. 13/559,643, Final Office Action mailed Aug. 27, 2015", 16 pgs.

(Continued)

*Primary Examiner* — Jared Fureman
*Assistant Examiner* — Joel Barnett
(74) *Attorney, Agent, or Firm* — Schwegman, Lundberg & Woessner, P.A.

(57) ABSTRACT

Some embodiments relate to an example generator management system. The generator management system includes a first generator that is adapted to supply power to load and a first generator controller that operates the first generator. The generator management system further includes a second generator that is adapted to supply power to the load and a second generator controller that operates the second generator. The generator management system further includes a communication bus that connects the first generator controller and the second generator controller such that the first generator controller and the second generator controller exchange data. At least one of the first generator controller and the second generator controller selectively activates the first generator and the second generator in an order that depends on an operating parameter of the first generator and the second generator (as opposed to a fixed sequence which is done in existing systems).

20 Claims, 1 Drawing Sheet

(56) References Cited

U.S. PATENT DOCUMENTS

| | | |
|---|---|---|
| 5,256,959 A | 10/1993 | Nagano et al. |
| 5,625,276 A | 4/1997 | Scott et al. |
| 5,635,768 A | 6/1997 | Birch et al. |
| 5,694,027 A | 12/1997 | Satake et al. |
| 5,703,410 A | 12/1997 | Maekawa |
| 5,730,098 A | 3/1998 | Sasak et al. |
| 5,886,890 A | 3/1999 | Ishida et al. |
| 5,949,153 A * | 9/1999 | Tison et al. .................. 307/29 |
| 6,191,500 B1 | 2/2001 | Toy |
| 6,631,310 B1 * | 10/2003 | Leslie .................. H02P 9/00 700/21 |
| 6,844,706 B2 | 1/2005 | Pinkerton, III et al. |
| 6,894,403 B2 | 5/2005 | Shinogi |
| 6,923,168 B2 | 8/2005 | Bryde |
| 8,049,348 B2 | 11/2011 | Czajkowski |
| 8,294,431 B2 | 10/2012 | McLean et al. |
| 8,766,479 B2 | 7/2014 | Dorn et al. |
| 2002/0089234 A1 * | 7/2002 | Gilbreth et al. .................. 307/80 |
| 2002/0134083 A1 * | 9/2002 | Staphanos et al. .............. 60/698 |
| 2005/0184589 A1 | 8/2005 | Fujita |
| 2006/0244327 A1 | 11/2006 | Kundel |
| 2007/0262661 A1 | 11/2007 | Ai |
| 2009/0012653 A1 * | 1/2009 | Cheng et al. .................. 700/287 |
| 2009/0164806 A1 | 6/2009 | Dishman et al. |
| 2010/0094490 A1 | 4/2010 | Alston et al. |
| 2010/0102637 A1 | 4/2010 | Dozier et al. |
| 2010/0156191 A1 * | 6/2010 | Dozier et al. .................. 307/81 |
| 2010/0207454 A1 | 8/2010 | Jagota et al. |
| 2011/0130917 A1 * | 6/2011 | Genssle et al. .................. 701/33 |
| 2011/0149624 A1 | 6/2011 | Yamanaka |
| 2011/0291411 A1 | 12/2011 | Folken |
| 2012/0007431 A1 | 1/2012 | Jang et al. |
| 2012/0049638 A1 * | 3/2012 | Dorn .................. H02J 3/42 307/87 |
| 2012/0242451 A1 | 9/2012 | Tanaka et al. |
| 2014/0001873 A1 | 1/2014 | Tian et al. |
| 2014/0028102 A1 | 1/2014 | Frampton |
| 2014/0309797 A1 | 10/2014 | Frampton et al. |

FOREIGN PATENT DOCUMENTS

| | | |
|---|---|---|
| CN | 102474450 | 5/2012 |
| EP | 1006641 A2 | 6/2000 |
| WO | WO-2008/130968 A1 | 10/2008 |
| WO | WO-2012/030947 A1 | 3/2012 |

OTHER PUBLICATIONS

"U.S. Appl. No. 13/559,643, Non Final Office Action mailed May 7, 2015", 12 pgs.

"U.S. Appl. No. 13/559,643, Response filed Jul. 20, 2015 to Non Final Office Action mailed May 7, 2015", 8 pgs.

"Chinese Application Serial No. 201310271829.0, Office Action mailed Feb. 27, 2015", (w/ English Translation), 19 pgs.

"European Application No. 13003380.6, European Search Report dated Feb. 17, 2-14", 9 pgs.

"European Application No. 13003380.6, Response filed Sep. 17, 2014 to European Search Report dated Feb. 17, 2014", 18 pgs.

"Chinese Application Serial No. 20130311755,9, Office Action mailed Aug. 21, 2015", (w/ English Translation), 11 pgs.

"U.S. Appl. No. 13/559,643, Notice of Allowance mailed Dec. 14, 2015", 11 pgs.

"U.S. Appl. No. 13/559,643, Response filed Nov. 20, 2015 to Final Office Action mailed Aug. 27, 2015", 8 pgs.

Chinese Application No. 201310269144.2, First Office Action dated Jul. 3, 2015, 9 pgs.

Chinese Application No. 201310311755.9, First Office Action dated Aug. 21, 2015, 11 pgs.

\* cited by examiner

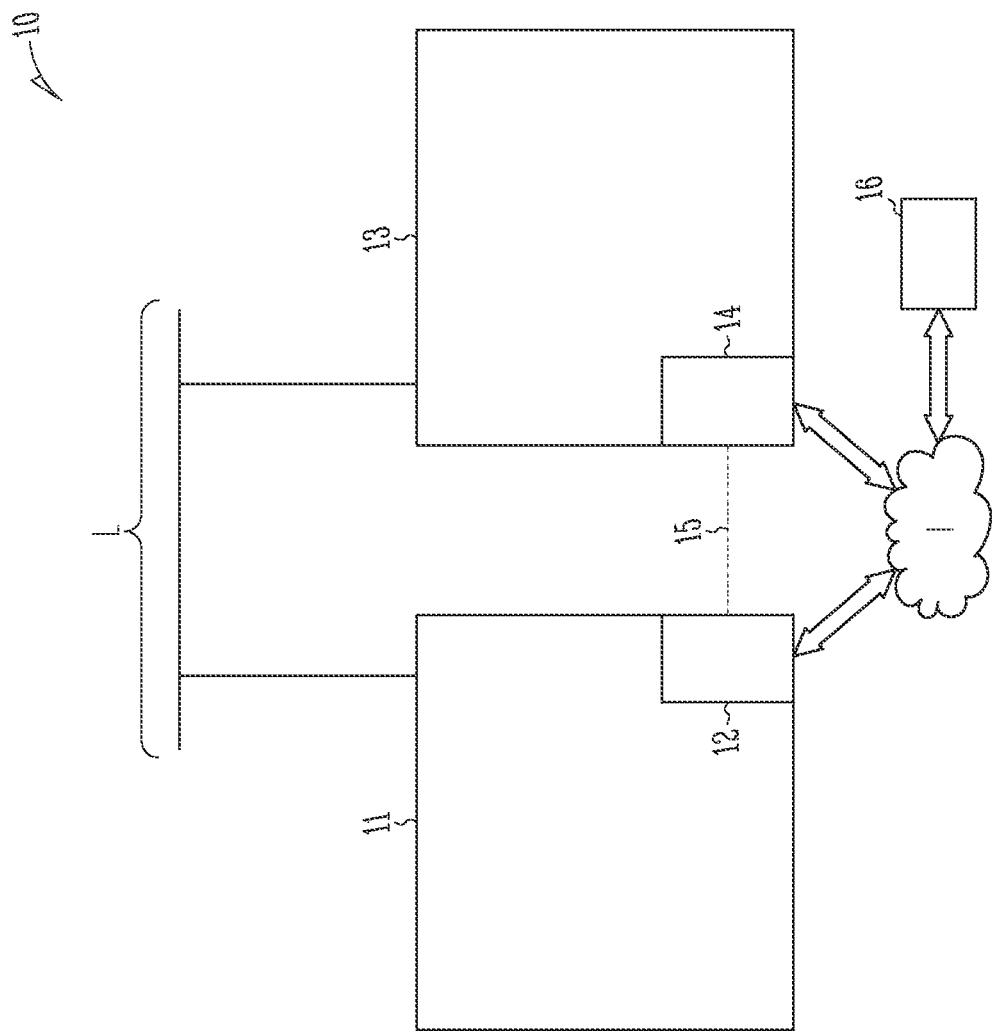

GENERATOR MANAGEMENT SYSTEM THAT SELECTIVELY ACTIVATES GENERATORS BASED ON AN OPERATING PARAMETER

TECHNICAL FIELD

Embodiments pertain to a generator management system, and more particularly to a generator management system that selectively activates generators based on an operating parameter.

BACKGROUND

Electric generators are typically used to provide electrical power. One common use of electric generators is as a standby power source. Another common use of electric generators is to provide power at a remote location where utility company power is not available.

One common type of electric generator includes an internal combustion engine. The internal combustion engine drives an electrical alternator that produces alternating electricity.

Many existing system often include multiple electric generators, especially in situations where there is a potential high demand for power. There can be advantages to employing multiple small generators rather than a single large generator.

One of the advantages is that if one generator fails, or requires maintenance, a multi-generator system can still supply some power while a single generator system would otherwise not be able to meet demand. Another advantage is that load growth may be addressed by adding another generator rather than replacing an existing generator with a larger (and more expensive) generator.

Another advantage of using multiple generators is that it is possible to stop generators that are not needed to provide power at a particular point in time. Stopping generators (i) saves wear and tear on the generators; (ii) decreases sound emissions at a location; (iii) decreases fuel consumption (and corresponding harmful environmental emissions).

Stopped generators can also be restarted as demand increases. This starting and stopping of certain generators within a plurality of generators is referred to as generator management.

Some of the drawbacks with existing generator management systems may include (i) the need for expensive external controls in order to adequately start and stop particular generators; or (ii) unequal wear of the generators resulting from the inability to dynamically change the order in which each of the plurality of generators are started and stopped in response to changes in demand.

BRIEF DESCRIPTION OF THE DRAWINGS

FIG. 1 is a schematic plan view of an example generator management system.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 is a schematic plan view of an example generator management system 10. The generator management system 10 includes a first generator 11 that is adapted to supply power to a load L and a first generator controller 12 that operates the first generator 11. The generator management system 10 further includes a second generator 13 that is adapted to supply power to the load L and a second generator controller 14 that operates the second generator 13.

The generator management system 10 further includes a communication bus 15 that connects the first generator controller 12 and the second generator controller 14 such that the first generator controller 12 and the second generator controller 14 exchange data. At least one of the first generator controller 12 and the second generator controller 14 selectively activates the first generator 11 and the second generator 13 in an order that depends on an operating parameter of the first generator 11 and the second generator 13 (as opposed to a fixed sequence or order which is done in existing systems). Therefore, the generator management system 10 is able to dynamically change the order in which each of the first and second generators 11, 13 are started and stopped in order to meet a changing demand for power at the load L.

In the example embodiment illustrated in FIG. 1, the generator management system 10 further includes a server 16 that is connected to the first and second generator controllers 12, 14 via a network (e.g. the Internet I). It should be noted that in embodiments that include server 16, at least one of the first generator controller 12, the second generator controller 14 and the server 16 may selectively activate the first generator 11 and the second generator 13 in an order that depends on an operating parameter of the first generator 11 and the second generator 13.

In some embodiments, the order in which the first generator 11 and the second generator 13 are selectively activated depends on a total number of run hours that is associated with each of the first and second generators 11, 13. As an example, the order may be established such that the one of the first generator and the second generator 11, 13 with the tower number of total run hours is selected to activate first.

Embodiments are also contemplated where the order depends on a total amount of emissions that are generated by each of the first and second generators 11, 13. As an example, the order is established such that the one of the first generator 11 and the second generator 13 which generates fewer emissions is selected to activate first.

It should be noted that various different types of emissions may be used to establish the order for selectively activating the first generator 11 and the second generator 13. Example emissions include hydrocarbon emissions and sound emissions (among others).

In some embodiments, the order in which the first generator 11 and the second generator 13 are selectively activated depends on a cost that is associated with operating each of the first and second generators 11, 13. As an example, the cost may be determined by a rate of fuel consumption of each of the first and second generators 11, 13. As another example, the cost may be determined by maintenance costs that are associated with operating each of the first and second generators 11, 13.

Embodiments are also contemplated where the order depends on a pre-fault condition that exists for each of the first and second generators 11, 13. One example pre-fault condition may be low fuel level. As an example, when one of the first and second generators 11, 13 has a low fuel level, the other of the first and second generators 11, 13 may be selectively activated first.

In embodiments where the first and second generators 11, 13 each supply the load through circuit breakers, an example pre-fault condition may be that one of the circuit breakers is unable to open. In this example, the generator that is connected to the load through the circuit breaker that is unable to open is selectively activated first.

In embodiments where the first and second generators 11, 13 each include an engine, the pre-fault condition may relate to an operating parameter of the respective engine. Some examples of pre-fault condition that relates to engines include; high coolant temperature warning, low oil pressure warning, sensor malfunction and low battery voltage warning.

Embodiments are also contemplated where the order depends on the age of the fuel with each respective engine. As an example, when one of the first and second generators 11, 13 has an older fuel supply, that generator 11, 13 that includes the older fuel supply may be selectively activated first to consume the older fuel.

In some embodiments, the order in which the first generator 11 and the second generator 13 are selectively activated depends on a minimum load requirement for each of the first and second generators 11, 13. As an example, the minimum load requirement may be set by local emissions standards.

Embodiments are contemplated where a secondary operating parameter is designated for selectively activating one of the first and second generators when the primary operating parameter is effectively equal.

As an example, during operation of the generator management system 10, the first and second generators 11, 13 will tend to equalize their primary operating parameter (e.g., fuel levels within the first and second generators 11, 13 will tend to equalize when the fuel level is the primary operating parameter). In addition, external activity may tend to equalize the primary operating parameter (e.g., when a fuel equalizing tube is placed between the first and second generators 11, 13).

It should be noted although only first and second generators 11, 13 are described herein, the generator management system 10 may include any additional number of generators. The generator management system 10 would be able to selectively activate some (or all) of the additional generators in an order that depends on an operating parameter of the generators.

The generator management systems 10 described herein may serve to equalize some primary (and possibly secondary) operating parameter of the generators that are part of the generator management system 10. In addition, the generator management systems 10 described may be able to dynamically change the order in which each of the generators within the generator management systems 10 are started and stopped to meet changing load demands (without the need for expensive external controls).

The Abstract is provided to comply with 37 C.F.R. Section 1.72(b) requiring an abstract that wilt allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A generator management system comprising:
a first generator that is adapted to supply power to a load;
a first generator controller that operates the first generator;
a second generator that is adapted to supply power to the load;
a second generator controller that operates the second generator;
a communication bus that directly connects the first generator controller and the second generator controller such that the first generator controller and the second generator controller exchange data; and
wherein at least one of the first generator controller and the second generator controller identifies an operating parameter of the first generator and the second generator that is shared between the first generator controller and the second generator controller directly via the communication bus in order to establish an order for activating the first generator and the second generator based on the operating parameter of the first generator and the second generator and dynamically updates the order for activating the first generator and the second generator based on the operating parameter of the first generator and the second generator.

2. A generator management system comprising:
a first generator that is adapted to supply power to a load;
a first generator controller that operates the first generator;
a second generator that is adapted to supply power to the load;
a second generator controller that operates the second generator;
a communication bus that directly connects the first generator controller and the second generator controller such that the first generator controller and the second generator controller exchange data; and
wherein at least one of the first generator controller and the second generator controller identifies an operating parameter of the first generator and the second generator establishes an order for activating the first generator and the second generator based on the operating parameter of the first generator and the second generator and dynamically updates the order for activating the first generator and the second generator based on the operating parameter of the first generator and the second generator, wherein the order depends on a total number of run hours that is associated with each of the first and second generators.

3. The generator management system of claim 1, wherein the order depends on a total amount of emissions that are generated by each of the first and second generators.

4. The generator management system of claim 3, wherein the order is established such that the one of the first generator and the second generator which generates fewer emissions is selected first.

5. The generator management system of claim 3, wherein the emissions that establish the order are hydrocarbon emissions.

6. The generator management system of claim 3, wherein the emissions that establish the order are sound emissions.

7. The generator management system of claim 1, wherein the order depends on a cost that is associated with operating each of the first and second generators.

8. The generator management system of claim 7, wherein the cost is determined by a rate of fuel consumption of each of the first and second generators.

9. The generator management system of claim 7, wherein the cost is determined by maintenance costs that are associated with operating each of the first and second generators.

10. The generator management system of claim 1, wherein the order depends on whether a pre-fault condition exists for each of the first and second generators.

11. The generator management system of claim 10, wherein the pre-fault condition is low fuel level.

12. The generator management system of claim 10, wherein the first and second generators each include an engine, and wherein the pre-fault condition relates to an operating parameter of the respective engine.

13. The generator management system of claim 1, wherein the order depends on a minimum load requirement for each of the first and second generators.

14. The generator management system of claim 13, wherein at least one of the first and second generators includes a diesel engine that has a particulate filter on which the minimum load requirement is based.

15. The generator management system of claim 13, wherein the minimum load requirement is set by local emissions standards.

16. The generator management system of claim 1, wherein a user selects the particular operating parameter of the first generator and the second generator that the controller utilizes to dynamically establish the order for activating the first generator and the second generator.

17. The generator management system of claim 1, wherein the order depends on an age of fuel that is used to run each of the first and second generators.

18. The generator management system of claim 1, wherein the controller utilizes a secondary operating parameter to dynamically establish the order for activating the first and second generator when the first operating parameter of the first and second generators is effectively equal.

19. The generator management system of claim 2, wherein the order is established such that the one of the first generator and the second generator with the lower number of total run hours is selected first.

20. A generator management system comprising:
a first generator that is adapted to supply power to a load;
a first generator controller that operates the first generator;
a second generator that is adapted to supply power to the load;
a second generator controller that operates the second generator;
a communication bus that directly connects the first and second generator controllers such that the first and second generator controllers exchange data; and
a server that is connected to the communication bus via a network,
wherein at least one of the first generator controller, the second generator controller, and the server identifies an operating parameter of the first generator and the second generator that is shared between the first generator controller and the second generator controller directly via the communication bus in order to establish an order for activating the first generator and the second generator based on the operating parameter of the first generator and the second generator and dynamically updates the order for activating the first generator and the second generator based on the operating parameter of the first generator and the second generator.

* * * * *